US012597211B2

(12) United States Patent
Tran et al.

(10) Patent No.:     US 12,597,211 B2
(45) Date of Patent:          Apr. 7, 2026

(54) GENERATING VARIANTS OF VIRTUAL OBJECTS BASED ON ADJUSTABLE EXTERNAL FACTORS

(71) Applicant: INTERNATIONAL BUSINESS MACHINES CORPORATION, Armonk, NY (US)

(72) Inventors: Thai Quoc Tran, San Jose, CA (US); Cindy Han Lu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 18/604,682

(22) Filed: Mar. 14, 2024

(65) Prior Publication Data

US 2025/0292512 A1      Sep. 18, 2025

(51) Int. Cl.
G06T 19/00          (2011.01)
G06T 17/00          (2006.01)

(52) U.S. Cl.
CPC .............. G06T 19/00 (2013.01); G06T 17/00 (2013.01)

(58) Field of Classification Search
None
See application file for complete search history.

(56) References Cited

U.S. PATENT DOCUMENTS 6,406,370 B1      6/2002  Kumagai
10,140,776 B2 *  11/2018  Schwarz ............. G06F 3/04842

12,165,274 B1 *  12/2024  Hansen ................... G06T 19/20
2006/0148545 A1    7/2006  Rhyne
2009/0017886 A1    1/2009  McGucken
(Continued)

FOREIGN PATENT DOCUMENTS

CN          101866495 A      10/2010
CN          102254344 A      11/2011
(Continued)

OTHER PUBLICATIONS

BEC, "Limestone mountains with 3D Norway spruce forest (*Picea abies*)", https://fredericbec.artstation.com/projects/QRExZ, Accessed Jul. 15, 2022, 4 Pages.
(Continued)

*Primary Examiner* — Saptarshi Mazumder
(74) *Attorney, Agent, or Firm* — Teddi E. Maranzano

(57)          ABSTRACT

An embodiment for dynamically generating variants of virtual objects based on adjustable external factors. The embodiment may identify control points within a target virtual object. The embodiment may identify one or more vertices associated with each one of the control points. The embodiment may determine conditional relationships between the one or more vertices and the each of the one control points associated with the one or more vertices, where the conditional relationships include effects on the one or more vertices in response to modifying the adjustable external factors observable at the control points. The embodiment may generate simulations in which selected values of the adjustable external factors are applied to the control points over a selected window of time. The embodiment may perform the generated simulations to generate, based on the determined conditional relationships, variants of the target virtual object.

14 Claims, 5 Drawing Sheets

(56) References Cited

U.S. PATENT DOCUMENTS

2016/0283094 A1* 9/2016 Choi ..................... G04C 3/001

FOREIGN PATENT DOCUMENTS

CN    104504752 A    4/2015
JP    2011008547 A    1/2011

OTHER PUBLICATIONS

E-ON Software, "PlantFactory Infinite Customization", https://info.
e-onsoftware.com/plantfactory/infinite_customization, Accessed Jul.
15, 2022, 3 Pages.
E-ON Software, "PlantFactory Node-based Modelling," https://info.
e-onsoftware.com/plantfactory/nodes, Accessed Jul. 15, 2022, 5
Pages.
Hitti, et al., "GrowSpace: Learning How to Shape Plants", arXiv:2110.
08307v1 [cs.LG] Oct. 15, 2021, 17 Pages.
Lam, et al., "Simulating tree growth based on internal and envi-
ronmental factors", Association for Computing Machinery, Inc.,
2005, 10 Pages.
Mourato, et al., "Automatic level generation for platform videogames
using genetic algorithms", ACE '11 Proceedings of the 8th Inter-
national Conference on Advances in Computer Entertainment Tech-
nology, Nov. 2011, Article No. 8, 9 Pages.
Pihlgren, et al., "Realistic NPCs in Video Games Using Different AI
Approaches", Chalmers University of Technology, Department of
Computer Science and Engineering, Jun. 2016, 72 Pages.

* cited by examiner

100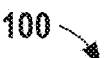

COMPUTER 101

PROCESSOR SET 110

| PROCESSING CIRCUITRY 120 | CACHE 121 |
| --- | --- |

COMMUNICATION FABRIC 111

VOLATILE MEMORY 112

PERSISTENT STORAGE 113

OPERATING SYSTEM 122

VIRTUAL OBJECT GENERATION PROGRAM 150

PERIPHERAL DEVICE SET 114

| UI DEVICE SET 123 | STORAGE 124 | IoT SENSOR SET 125 |
| --- | --- | --- |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

Figure 1

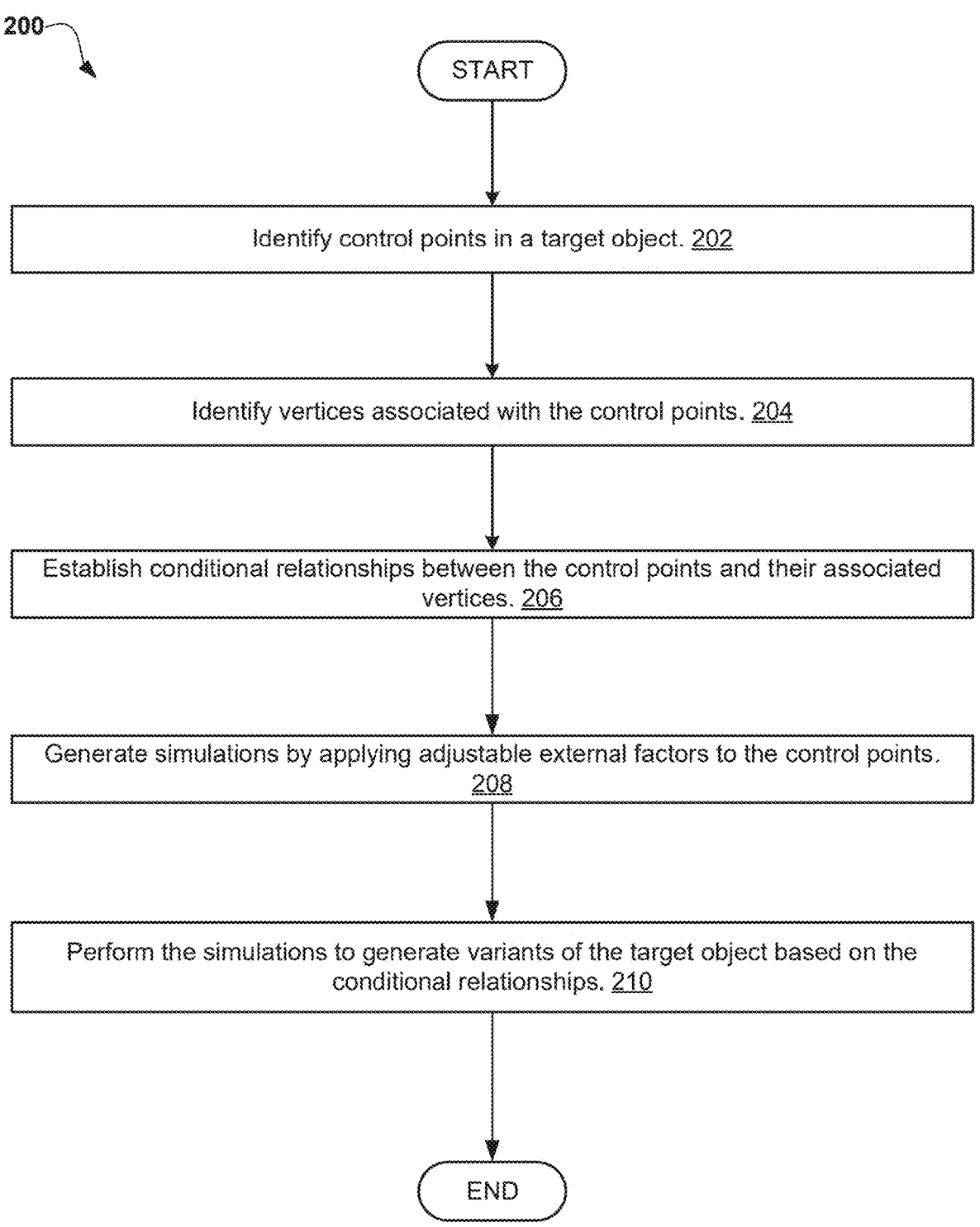

200

START

Identify control points in a target object. 202

Identify vertices associated with the control points. 204

Establish conditional relationships between the control points and their associated vertices. 206

Generate simulations by applying adjustable external factors to the control points. 208

Perform the simulations to generate variants of the target object based on the conditional relationships. 210

END

Figure 2

GENERATING VARIANTS OF VIRTUAL OBJECTS BASED ON ADJUSTABLE EXTERNAL FACTORS

BACKGROUND

The present application relates generally to computer processing, and more particularly, to dynamically generating variants of virtual objects based on adjustable external factors.

Businesses involved in animated media, game design, or any generation of digital graphics are constantly tasked with creating, designing, and filling landscapes, backgrounds, and other large spaces with a variety of virtual objects. As technology improves, consumers continue to expect more realistic and detailed environments. Businesses constantly strive to improve their ability to generate large volumes of virtual objects to design large environments more efficiently while maintaining high quality and realistic environment features.

SUMMARY

According to one embodiment, a method, computer system, and computer program product for dynamically generating variants of virtual objects based on adjustable external factors is provided. The embodiment may include identifying control points within a target virtual object. The embodiment may further include identifying one or more vertices associated with each one of the control points. The embodiment may also include determining conditional relationships between the one or more vertices and the each of the one control points associated with the one or more vertices, where the conditional relationships include effects on the one or more vertices in response to modifying the adjustable external factors observable at the control points. The embodiment may further include generating simulations in which selected values of the adjustable external factors are applied to the control points over a selected window of time. The embodiment may also include performing the generated simulations to generate, based on the determined conditional relationships, variants of the target virtual object.

BRIEF DESCRIPTION OF THE SEVERAL VIEWS OF THE DRAWINGS

These and other virtual objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary networked computer environment according to at least one embodiment;

FIG. 2 illustrates an operational flowchart for an exemplary process of dynamically generating variants of virtual objects based on adjustable external factors according to at least one embodiment;

DETAILED DESCRIPTION

Figure 3:
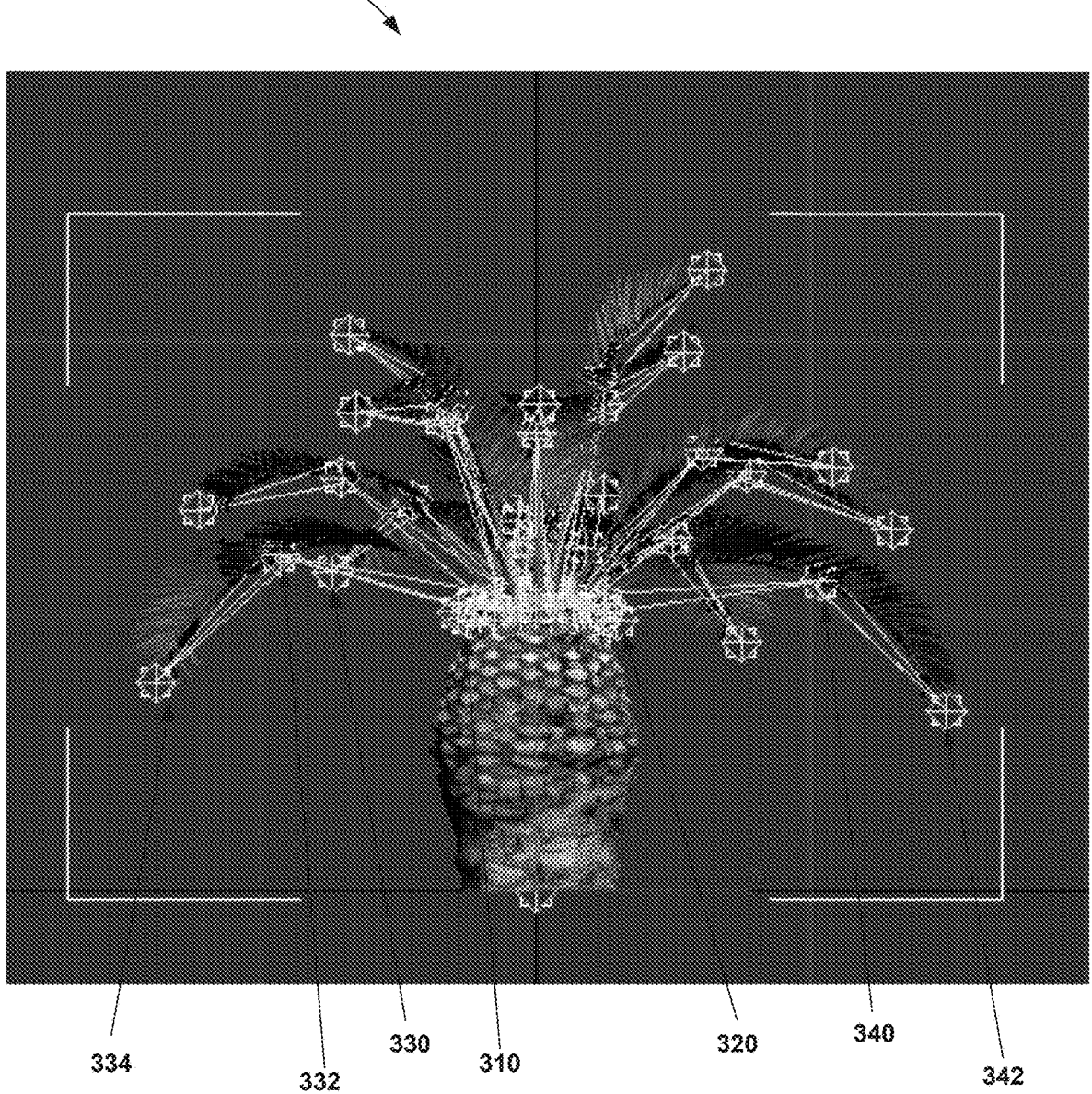
FIG. 3 illustrates an exemplary target virtual object having a series of identified control points and associated vertices according to at least on embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to dynamically generating variants of virtual objects based on adjustable external factors. The following described exemplary embodiments provide a system, method, and program product to, among other things, identify control points within a target virtual object, identify one or more vertices associated with each one of the control points, determine conditional relationships between the one or more vertices and the each one of the control points with which they are associated, wherein the conditional relationships include effects on the one or more vertices in response to modifying a series of adjustable external factors observable at the control points, generate simulations in which selected values of the adjustable external factors are applied to the control points over a selected window of time, and perform the generated simulations to generate, based on the determined conditional relationships, variants of the target virtual object.

As previously described, businesses involved in animated media, game design, or any generation of digital graphics are constantly tasked with creating, designing, and filling landscapes, backgrounds, and other large spaces with a variety of virtual objects. As technology improves, consumers continue to expect more realistic and detailed environments. Businesses constantly strive to improve their ability to generate large volumes of virtual objects to design large environments more efficiently while maintaining high quality and realistic environment features.

However, there are several challenges faced when trying to design and implement large quantities of realistic virtual objects and models in a large environment. Historically, designing large and realistic environments would involve significant time investments by multiple design personnel. Over time, environment designers began to apply various randomization algorithms configured to apply random modifications to generate variants of virtual objects. While this approach creates some diversity in the features of the virtual objects and models within a given environment for a more realistic feel, it does not consider organic mutations or changes that may be observed over time in the object. Thus, methods allowing for the design of more realistic environments involving virtual objects and models which dynamically change over the course of a natural lifecycle based on the features and properties of the environment in which the models are positioned would be advantageous.

Accordingly, a method, computer system, and computer program product for dynamically generating variants of virtual objects based on adjustable external factors is provided. The method, system, and computer program product may identify control points within a target virtual object. The method, system, computer program product may identify one or more vertices associated with each one of the control points. The method, system, computer program product may then determine conditional relationships between the one or more vertices and the each of the one control points associated with the one or more vertices, where the conditional relationships include effects on the one or more vertices in response to modifying the adjustable external factors observable at the control points. The method, system, computer program product may generate simulations in which selected values of the adjustable external factors are applied to the control points over a selected window of time. Thereafter, the method, system, computer program product may perform the generated simulations to generate, based on the determined conditional relationships, variants of the target virtual object. In turn, the method, system, computer program product has provided for improved dynamic generation of variants of virtual objects based on adjustable external factors. Described embodiments determine conditional relationships between identified control points and associated vertices of the target virtual object which include effects on the associated vertices which occur in response to modifying a series of adjustable external factors observable at the control points. This allows described embodiments to generate simulations, over a selected period of time, by selecting and applying values of the adjustable external factors to the control points. Described embodiments may then perform the generated simulations to generate variants of the target virtual object which may represent how the target virtual object would realistically evolve or mutate over time in an environment having features corresponding to the selected and applied values of the adjustable external factors. Thus, described embodiments may allow designers of large environments to automatically generate realistic and naturally mutating variants of target virtual objects over time by simply modifying a single target virtual object (model) based on the selected and applied values of relevant adjustable external factors. Certain described embodiments may further leverage described methods to automatically generate and save large quantities of variants of the target virtual object for building libraries of models (virtual objects) for a given environment. Certain other described embodiments may further leverage described methods to render variants of virtual objects in real time. Thus, described embodiments provide improved methods of dynamically generating virtual object variants which are automatic, efficient, and are able to simulate realistic mutation and evolution of target virtual objects over time based on adjustable external factors of a given environment.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as virtual object generation program/code 150. In addition to virtual object generation code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and virtual object generation code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in virtual object generation code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in virtual object generation program 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the virtual object generation program 150 may be a program capable of identifying control points within a target virtual object. The virtual object generation program 150 may then identify one or more vertices associated with each one of the control points. Next, the virtual object generation program 150 may determine conditional relationships between the one or more vertices and the each of the one control points associated with the one or more vertices, where the conditional relationships include effects on the one or more vertices in response to modifying the adjustable external factors observable at the control points. The virtual object generation program 150 may then generate simulations in which selected values of the adjustable external factors are applied to the control points over a selected window of time. Thereafter, the virtual object generation program 150 may perform the generated simulations to generate, based on the determined conditional relationships, variants of the target virtual object.

In turn, the described method, system, computer program product has provided for improved dynamic generation of variants of virtual objects based on adjustable external factors. Specifically, generated variants of the target virtual object may represent how the target virtual object would realistically evolve or mutate over time in an environment having features corresponding to the selected and applied values of the adjustable external factors. Thus, according to one embodiment, the present invention may automatically generate realistic and naturally mutating variants of target objects over time by modifying a single target object based on the selected and applied values of relevant adjustable external factors. Certain described embodiments may further leverage described methods to automatically generate and save large quantities of variants of the target object for building libraries of objects (models) for a given environment. Certain other described embodiments may further leverage described methods to render variants of objects in real time. Thus, described embodiments dynamically generate object variants which are automatic, efficient, and can simulate realistic mutation and evolution of target objects over time based on adjustable external factors of a given environment.

Referring now to FIG. 2, an operational flowchart for an illustrative process 200 of dynamically generating variants of virtual objects based on adjustable external factors according to at least one embodiment is provided.

At 202, the virtual object generation program 150 may identify control points within a target virtual object. In the context of this disclosure, the target virtual object (sometimes referred to as 'target model') may include any digital object, model, or structure that is being generated and placed within any digital environment. For example, the digital environment may be an animated background, landscape, or other digital environment within which the target virtual object may be placed. The identified control points may include structural regions of the target virtual object which support one or more vertices or other structural regions of the target virtual object. In some embodiments, the virtual object generation program 150 may receive imported target virtual objects having control points already identified. In other embodiments, the virtual object generation program 150 may identify control points within the target virtual objects by receiving input from a user, where the user input identifies the control points on the target virtual object. In embodiments, the virtual object generation program 150 may include and use any suitable computer graphics software toolset used for creating animated films, visual effects, art, 3D printed models, motion graphics, virtual reality, computer games, and/or interactive 3D effects to allow a user to manually indicate or select control points on the target virtual object. In some embodiments, the suitable computer graphics software toolsets utilized by the virtual object generation program 150 may 'unwrap' an imported target virtual object or model, for example, by mapping 3-dimensional virtual objects onto 2-dimensional planes to facilitate the identification and mapping of control points and their associated vertices.

At 204, the virtual object generation program 150 may identify one or more vertices associated with each one of the control points. In the context of this disclosure, vertices associated with a given control point are those vertices which are directly affected by any changes made or stimuli applied at the given control point. As may be observed in more traditional rigging in animation, where one or more vertices may be deformed around a bone, the one or more vertices in presently described embodiments may be instead modified or deformed around the control point. However, as will be explained in greater detail below, the transmutation of the vertices in presently described embodiments is controlled by adjustable external factors rather than being controlled by movement of joints. In some embodiments, the virtual object generation program 150 may receive imported target virtual objects having vertices of the target virtual object already identified. In other embodiments, the virtual object generation program 150 may identify the vertices within the target virtual objects by receiving manual input from a user, where the user input identifies the vertices on the target virtual object. For example, the user input may include an indication or identification of control points from a user using the previously described software tools associated with the object generation program 150. In other embodiments, the virtual object generation program 150 may use the identified control points to identify vertices automatically based on structural proximity and connected regions or surfaces. For example, if an exemplary target virtual object including a tree has an exemplary control point on a region of the trunk, the virtual object generation program 150 may automatically identify, based on structural proximity, and connected regions or surfaces, multiple vertices along the length of a branch directly connected, and thereby in close proximity, to the exemplary control point on the trunk.

FIG. 3 illustrates an exemplary target virtual object 300 having a series of identified control points and associated vertices according to at least on embodiment. As shown in FIG. 3, the exemplary target virtual object 300, which has a tree-type structure may have a series of identified control points, such as exemplary control points 310 and 320 positioned near a portion of the tree corresponding to the trunk. For each of the identified control points, the virtual object generation program 150 identifies a series of associated vertices which are dependent upon an associated control point. As shown in FIG. 3, a first exemplary control point 310 is positioned on a first left side of the tree trunk of the target virtual object 300, while a second exemplary control point 320 is positioned near a second right side of the tree trunk. A first series of associated vertices 330, 332, and 334 identified by the virtual object generation program 150 are associated with control point 310 and are thus directly affected by external factors or stimuli applied to associated control point 310. Similarly, the virtual object generation program 150 has identified associated vertices 340 and 342, each of which are directly affected by external factors or stimuli applied to associated control point 320. As will be discussed in greater detail below, the relationships between the individual associated vertices and a given respective associated control point with regard to the effects of adjustable external factors applied to the respective associated control point may be different for each of the vertices.

At 206, the virtual object generation program 150 may determine conditional relationships between the one or more vertices and the each of the one control points associated with the one or more vertices, where the relationships include effects on the one or more vertices in response to modifying the adjustable external factors observable at the control points. In other words, the virtual object generation program 150 may determine rules or dependencies related to the effect on the vertices caused by adjusting the value of the external factors observable at a given control point. In embodiments, the effects on the vertices may include modifications involving multiple phenotypes. For example, effects on the one or more vertices may relate to exemplary phenotypes including color, bend, transform, scale, or any other suitable properties or modification types. Typically, exemplary phenotypes corresponding to the effects on the one or more vertices may be related to effects associated with suitable graphic software tools employed by the virtual object generation program 150. Determining the conditional relationships between the one or more vertices and the each one of the control points with which they are associated allows the virtual object generation program 150 to simulate, as will be described in greater detail below, what effects may occur at the one or more vertices in response to modifying adjustable external factors at an associated control point.

In the context of this disclosure, the adjustable external factors refer to any modifiable variables that may be observable at the control point which are not directly related to structure or movement of the control point. The adjustable external factors may sometimes be referred to as stimuli or environmental factors, as they may relate to various features of the environment in which the target virtual object will ultimately be placed. For example, according to one embodiment, the virtual object generation program 150 may consider adjustable external factors or stimuli which include, but are not limited to, gravity, light, air pollution, parasites, radioactivity, oxygen levels, pesticides, fertilizers, natural disasters, and any other suitable adjustable external factors as may be relevant for a given environment or setting to be filled with target virtual objects or models.

According to one embodiment, the virtual object generation program 150 may receive the conditional relationships from a user. For example, the virtual object generation program 150 may receive, from a user, rules or conditions related to how stimuli experienced at an exemplary control point will affect a given associated exemplary vertex. In that same example, the virtual object generation program 150 may further receive a weight value from the user, representing the extent to which the exemplary vertex would change in response to stimuli experienced at the associated control point. According to one embodiment, the virtual object generation program 150 may include preconfigured conditional relationships that may be, for example, included with the importing of a given target virtual object. In yet another embodiment, the virtual object generation program 150 may extract the conditional relationships from accessible historical virtual objects that are similar to serve as a default setting or relationship for a model having unknown relationships or properties. In yet another embodiment, a suitable model may be trained on historical data to generate predicted default conditional relationships for target virtual objects. It should be noted that each conditional relationship may be specific to a given stimulus and its expected effect on a target virtual object depending upon the properties of the region of the target virtual object where it is being applied.

Accordingly, at this step, the virtual object generation program 150 may determine the relationships between the adjustable external factors at the control points and resulting effects that would occur at associated vertices to enable virtual object generation program 150 to simulate how the target virtual object (model) may change over time in response to specific values of the adjustable external factors (stimuli). For example, at this step, virtual object generation program 150 may have identified control points and associated vertices for an exemplary target virtual object (model) 'T' which is a model of a pine tree, and may now, at this step, determine relationships between an exemplary control point 'CP1' which may correspond to a region of the tree's trunk, and exemplary vertices 'V1', 'V2', and 'V3' respectively which may correspond to regions of the tree's branch, where V1 is closest to the exemplary control point 'CP1'. The relationship determined by virtual object generation program 150 may include the expected effects on the exemplary vertices 'V1', 'V2', and 'V3' in response to modifying an exemplary adjustable external factor (stimuli) at exemplary control point 'CP1'. In embodiments, the determined conditional relationships may further include unique weight values for each vertex, indicating how sensitive each vertex is to changes made to the values of specific adjustable external factors at the associated control point. For example, the Vertex 'V3' may have a higher weight value indicating that it is more sensitive to adjustments made to a given stimuli at the associated control point, while Vertex 'V1' may have a lower weight value indicating that it is less sensitive to adjustments made to the given stimuli.

In certain embodiments, the virtual object generation program 150 may determine the weight values or sensitivities associated with a given conditional relationship between a control point and an associated vertex by interpreting weight paintings at the control point. In embodiments, the virtual object generation program 150 may extract the weight values from a weight map which was generated by placing weight paint onto the target virtual object by a user. In such embodiments, the virtual object generation program 150 may be preconfigured with a set of rules to interpret different colors as being indicative of specific weights or sensitivities of a given vertex to experience effects or changes based on stimuli or adjustable eternal factors applied at the associated control point.

Next, at 208, the virtual object generation program 150 may generate simulations in which selected values of the adjustable external factors are applied to the control points over a selected window of time. The virtual object generation program 150 may generate simulations that demonstrate effects on the target virtual object that occur in response to applying values of the adjustable external factors to the control point over a given duration of time. The virtual object generation program 150 generate simulations including modifications to a single adjustable external factor, or to multiple adjustable external factors. According to one embodiment, the virtual object generation program 150 may select values of the adjustable external factors which fall within a preconfigured range or threshold of values. For example, in embodiments the virtual object generation program 150 may randomly select a value for an exemplary adjustable external factor of 'wind' that is between 70 and 90, where 0 corresponds to no wind effects on the target virtual object, and 100 would result in large wind effects. In this example, the virtual object generation program 150 would thus generate a simulation of an environment having substantial observable wind effects. The virtual object generation program 150 may further select a duration or window of time for the generated simulation, thereby enabling subsequent simulation of the effects of the adjustable external factors on the target virtual object over the window of time.

At 210, the virtual object generation program 150 may perform the generated simulations to generate, based on the determined conditional relationships, variants of the target virtual object. Returning to the example above, an exemplary target virtual object corresponding to a tree having control points with the 'wind' adjusted to a value of 0 may result in generation of a target virtual object variant which appears as a healthy and unimpacted tree where the associated vertices experience minimal or no changes. However, if the virtual object generation program 150 performs a generated simulation in which the control points are subject to an external factor 'wind' adjusted to a value of 90, this may result in generation of a target virtual object variant which appears unhealthy, having broken branches and significantly less leaves on the tree. This would result in large amounts of changes and mutations experienced at the vertices associated with the control point being subject to the adjustable external factor (stimuli). According to one embodiment, the impact on the vertices may be weighted individually based on their individual dependency relationships with the control point with which they are associated. For example, the vertices further from the control point may be more heavily impacted by larger values of the 'wind' stimuli, while vertices closer to the control point (the tree trunk) may be impacted less due to different weighted dependency values. In embodiments, these dependencies and weights are determined by the virtual object generation program 150 at step 206 as a part of determining the conditional relationships between each of the control points and the one or more vertices associated therewith. In other embodiments, the dependencies and weights may be input by a user.

Another similar example may be considered, in which an exemplary target virtual object includes a first control point (A), where an exemplary adjustable external factor may include 'deforestation' ranging from values of 1-10, where 10 is most extreme. In this example, it may be assumed that increasing the 'deforestation' value, cutting the trees, will stunt the tree growth and cause its branches to wither. In embodiments, a user may paint weights associated with the adjustable external factor of deforestation onto the mesh of the target virtual object so that the virtual object generation program 150 may effectively simulate which control points are most affected. In embodiments, the effects experienced may correspond to available tools or modifications which may be manually employed using suitable graphic software tools. Accordingly, the expected outcome from simulating the adjustable external factor of 'deforestation, or the corresponding phenotype likely to be involved by the effects, may include changes corresponding to tools for 'scale' and 'prune' effects. Accordingly, an exemplary variant of the target virtual object subject to a maximum 'deforestation' value, and therefore most affected, would effectively be pruned and scaled to zero. Considering a second exemplary control point (B), where the adjustable external factor is also 'deforestation' from values of 1-10, where 10 is most extreme, as well as a second adjustable external factor of 'wind' having values ranging from 1-10, where 10 is most extreme. It is assumed that extreme wind will negatively impact branch growth and cause the branches to wither. As previously described, a user may control the finer details of certain vertices by indicating (via painting, for example) both deforestation and wind weights onto the mesh of the target virtual object, using independent channels. For control point (B) the phenotype effected may include, for example, 'color' and 'alpha clipping', where the vertices most affected have their alpha threshold set at maximum so that the leaves in the branches do not appear at all. In certain embodiments, a user may optionally iterate through a cycle by adjusting the adjustable external factors of 'deforestation' and 'wind' until they obtain a desirable variant, which may then be optionally saved for later use.

Figure 4:
FIG. 4 illustrates a series of generated variants of a target virtual object based on an exemplary generated simulations including a series of applied adjustable external factors according to at least one embodiment.

FIG. 4 illustrates a series of generated variants of a target virtual object 400 based on an exemplary generated simulations including a series of applied adjustable external factors according to at least one embodiment. In FIG. 4, virtual object generation program 150 has performed generated simulations in which adjustable external factors of 'wind' and 'deforestation' have been applied to control points of an exemplary target virtual object corresponding to a tree. FIG. 4 depicts six generated variants, where a measurable metric of 'Health' of the tree corresponding to the target virtual object is shown. In FIG. 4, modifying the applied values of the adjustable external factors across the simulations performed by virtual object generation program 150 resulted in the generation of six different variants reflecting the mutations or changes to the target virtual object that may be expected because of the applied adjustable external factors. For example, as the adjustable external factors of 'wind' and 'deforestation' applied at the control points of the target virtual object decreased, the generated variants included more leaves and healthier tree features, leading to a higher 'Health' percentage, represented by the trees towards the right-most side of FIG. 4. The generated variants of FIG. 4 are merely illustrative, and it may be understood that the virtual object generation program 150 may generate and perform additional simulations to generate any desired number of variants of the target virtual object by modifying the applied adjustable external factors.

According to one embodiment, in which an exemplary control points (B) is a child of control point (A), the virtual object generation program 150 may automatically assign the properties of the parent control point (A) to the child control point (B), as they may inherently share those properties. For example, according to one embodiment, if an exemplary parent control point A is pruned, an exemplary control point B would be pruned as well. However, the reverse may not be true. In another example, an illustrative tree limb may have an exemplary 'disease' stimulus applied to one or more control points that slowly deteriorates (removes) leaves along associated vertices on an associated branch. Therefore, nearby child control points on the same plant may inherit certain properties such that leaves would similarly not successfully grow on associated nearby vertices. According to one embodiment, child control points may not be directly part of a given target virtual object but may still be associated with a given parent control point via proximity or some other reason for association, allowing for a collection of several virtual objects to be treated as one model for purposes of transferring the effects of a given stimulus to certain virtual objects in a shared environment or space. For example, if a first exemplary target virtual object of a tree in a given environment is subject to an exemplary stimulus 'disease' via direct contact, airborne exposure, soilborne exposure, human activity (poor pruning), or for any other reason, the exemplary 'disease' stimulus and its effect on vertices and virtual objects could get passed to sibling control points on nearby trees via certain branches or portions of the exemplary target virtual object that may be touching another virtual object in the same environment.

Accordingly, the virtual object generation program 150 may generate multiple variants of the target virtual object over the selected period of time which are representative of the expected effects or changes that will be experienced based on the applied adjustable external factors or stimuli. The generated variants may be saved and stored to allow for the design of environments including virtual objects or models which may evolve and change over time based on the generated variants. This is particularly useful in life-like digital environments having some version of a time cycle and environmental stimuli or features which allow the life-like digital environment to change over time. Alternatively, the variants may simply be saved within a library to allow for a larger variety of static model options when attempting to fill up an environment having certain features.

Figure 5:
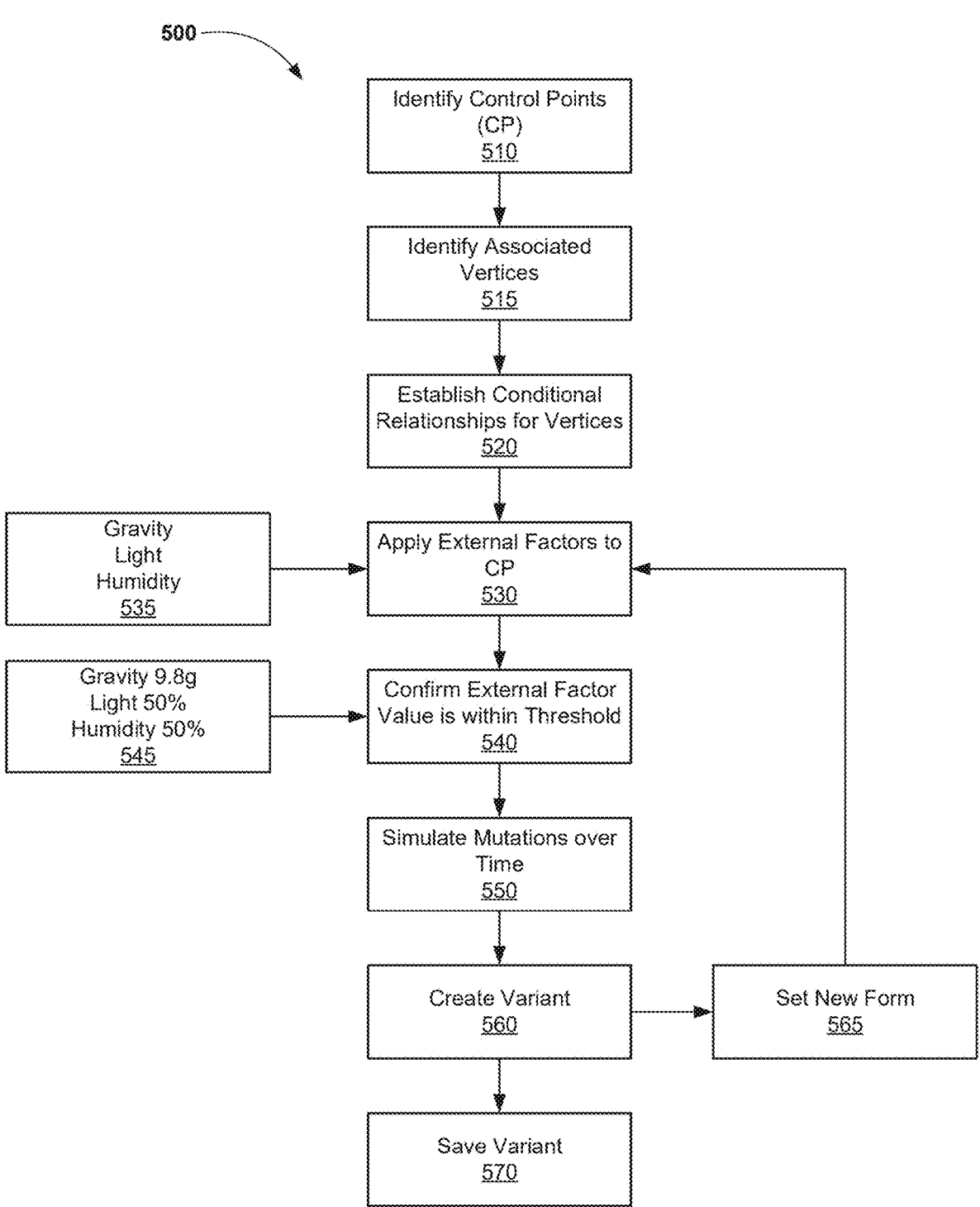
FIG. 5 illustrates a diagrammatic view of an exemplary process of dynamically generating variants of virtual objects based on adjustable external factors according to at least one embodiment.

In embodiments, the virtual object generation program 150 may include and run in multiple different modes. FIG. 5 illustrates a diagrammatic view of an exemplary process 500 of dynamically generating variants of virtual objects based on adjustable external factors according to at least one embodiment. Specifically, the process depicted in FIG. 5 allows the virtual object generation program 150 to save the generated virtual object variants such that they may be collected and stored within a collection for use at a later time, as discussed above.

According to one embodiment, the virtual object generation program 150 may execute an exemplary process 500 as shown in FIG. 5 by first identifying control points of a target virtual object at 510, identifying associated vertices at 515, determining conditional relationships for the vertices at 520 (as described above), and applying external factors for the control points at 530. In FIG. 5, the external factors include gravity, light, and humidity, as shown at 535. Then, the virtual object generation program 150 may confirm the applied external factors are within a preconfigured threshold at 540. The threshold may be in the form of a range of values allowable for the applied adjustable external factors, or in the form of an upper or lower limit on the allowable values for the adjustable external factors. In FIG. 5, the thresholds employed by the virtual object generation program 150 for each external factor are shown at 545 as upper limits on the values. The virtual object generation program 150 may then simulate mutations over time in the target virtual object at 550, including a selected time or duration 555. At 560, the virtual object generation program 150 may create a variant of the target virtual object and set a new form for the generated variant at 565. In the context of this disclosure, a new form may be a most recently generated variant of the target virtual object which may be used for further generation of virtual object variants. For example, the set new form at 565 may be iteratively subjected to the external factors or stimuli during subsequent simulations to continually generate additional variants until a maximum or minimum threshold for the selected and applied adjustable external factors is met. Thereafter, at 570, the virtual object generation program 150 may save the generated variants of the target virtual object into a collection for later use.

In other embodiments, the virtual object generation program 150 may instead be used to simulate and render virtual object variants in real time rather than saving the virtual object variants for later use. Such embodiments are typically more computationally demanding but may be particularly useful for exploring key virtual objects that a developer may want to highlight, or for making movies or other digital media. In embodiments, the virtual object generation program 150 may run exemplary simulations in a stepwise mode, frame-by-frame, to allow computation of a given mutation to happen before each render.

It may be appreciated that the virtual object generation program 150 has thus provided improved dynamic generation of variants of virtual objects based on adjustable external factors. Described embodiments determine conditional relationships between identified control points and associated vertices of the target virtual object which include effects on the associated vertices which occur in response to modifying a series of adjustable external factors observable at the control points. This allows described embodiments to generate simulations, over a selected period of time, by selecting and applying values of the adjustable external factors to the control points. Described embodiments may then perform the generated simulations to generate variants of the target virtual object which may represent how the target virtual object would realistically evolve or mutate over time in an environment having features corresponding to the selected and applied values of the adjustable external factors. Thus, described embodiments may allow designers of large environments to automatically generate realistic and naturally mutating variants of target virtual objects over time by simply modifying a single target virtual object (model) based on the selected and applied values of relevant adjustable external factors. Certain described embodiments may further leverage described methods to automatically generate and save large quantities of variants of the target virtual object for building libraries of models (virtual objects) for a given environment. Certain other described embodiments may further leverage described methods to render variants of virtual objects in real time. Thus, described embodiments provide improved methods of dynamically generating virtual object variants which are automatic, efficient, and are able to simulate realistic mutation and evolution of target virtual objects over time based on adjustable external factors of a given environment.

It may be appreciated that FIGS. 2-5 provide only illustrations of an exemplary implementation and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of dynamically generating variants of virtual objects based on adjustable external factors, the method comprising:

determining conditional relationships between one or more vertices and each of one or more control points associated with the one or more vertices, wherein the conditional relationships include weights corresponding to each of the one or more vertices, the weights indicating sensitivity of the each of the one or more vertices to modifying a respective one of a series of adjustable external factors observable at the control points, and wherein the weights are associated with a weight map, the weight map generated by applying weight paint to each of the one or more vertices;

generating simulations in which selected values of the adjustable external factors are applied to the control points over a selected window of time; and performing the generated simulations to generate, based on the determined conditional relationships, variants of a target virtual object.

2. The computer-based method of claim 1, further comprising:

saving and storing the generated variants of the target virtual object.

3. The computer-based method of claim 1, further comprising:

rendering an environment in real time, the rendered environment including the generated variants of the target virtual object.

4. The computer-based method of claim 1, wherein the selected values of the adjustable external factors applied to the control points are selected from a preconfigured range of values.

5. The computer-based method of claim 1, further comprising:

setting a new form corresponding to a first generated variant of the target virtual object; and iteratively selecting and applying the values of the adjustable external factors to the set new form to generate subsequent variants until a threshold value of an adjustable external factor has been reached.

6. A computer system, the computer system comprising: one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising: determining conditional relationships between one or more vertices and each of one or more control points associated with the one or more vertices, wherein the conditional relationships include weights corresponding to each of the one or more vertices, the weights indicating sensitivity of the each of the one or more vertices to modifying a respective one of a series of adjustable external factors observable at the control points, and wherein the weights are associated with a weight map, the weight map generated by applying weight paint to each of the one or more vertices; generating simulations in which selected values of the adjustable external factors are applied to the control points over a selected window of time; and performing the generated simulations to generate, based on the determined conditional relationships, variants of a target virtual object.

7. The computer system of claim 6, further comprising: saving and storing the generated variants of the target virtual object.

8. The computer system of claim 6, further comprising: rendering an environment in real time, the rendered environment including the generated variants of the target virtual object.

9. The computer system of claim 6, wherein the selected values of the adjustable external factors applied to the control points are selected from a preconfigured range of values.

10. The computer system of claim 9, further comprising: setting a new form corresponding to a first generated variant of the target virtual object; and iteratively selecting and applying the values of the adjustable external factors to the set new form to generate subsequent variants until a threshold value of an adjustable external factor has been reached.

11. A computer program product, the computer program product comprising: one or more computer-readable tangible storage medium and program instructions stored on at least one of the one or more computer-readable tangible storage medium, the program instructions executable by a processor capable of performing a method, the method comprising: determining conditional relationships between one or more vertices and each of one or more control points associated with the one or more vertices, wherein the conditional relationships include weights corresponding to each of the one or more vertices, the weights indicating sensitivity of the each of the one or more vertices to modifying a respective one of a series of adjustable external factors observable at the control points, and wherein the weights are associated with a weight map, the weight map generated by applying weight paint to each of the one or more vertices; generating simulations in which selected values of the adjustable external factors are applied to the control points over a selected window of time; and performing the generated simulations to generate, based on the determined conditional relationships, variants of a target virtual object.

12. The computer program product of claim 11, further comprising: saving and storing the generated variants of the target virtual object.

13. The computer program product of claim 11, further comprising: rendering an environment in real time, the rendered environment including the generated variants of the target virtual object.

14. The computer program product of claim 11, wherein the selected values of the adjustable external factors applied to the control points are selected from a preconfigured range of values.

* * * * *